United States Patent Office 3,793,297
Patented Feb. 19, 1974

3,793,297
REACTION PRODUCT OF A PHOSPHORO-DITHIOATE AND A CARBODIIMIDE
Milton Braid, Westmont, N.J., assignor to Mobil Oil Corporation
No Drawing. Original application Aug. 23, 1968, Ser. No. 754,943, now Patent No. 3,499,838. Divided and this application June 24, 1969, Ser. No. 844,714
Int. Cl. C07f 9/16; C10m 1/48
U.S. Cl. 260—944                9 Claims

ABSTRACT OF THE DISCLOSURE

Novel compounds are prepared by reacting a di(organo), preferably a dihydrocarbyl, phosphorodithioate with a di(organo), preferably a dihydrocarbyl, carbodiimide. These compounds possess excellent antioxidant properties and can be used in industrial organic fluids, such as lubricating oils, hydraulic fluids and the like. Diarylphosphorodithioates are preferred reactants.

This application is a division of copending application Ser. No. 754,943, filed Aug. 23, 1968, now U.S. 3,499,838.

BACKGROUND OF THE INVENTION

Field of the invention

This invention relates to novel organic reaction products containing phosphorus which possess oxidation inhibiting properties, and more particularly, it relates to reaction products which may be used to protect organic fluids from oxidation deterioration.

Description of the prior art

U.S. Pat. 3,058,910 describes the preparation of alkylene polyamine-dithiophosphoric acid ester products described as having corrosion inhibition properties. The dithiophosphoric acid esters are obtained by reacting a phenol, such as nonylphenol, and phosphorus pentasulfide, a known reaction. The ester is then reacted with an alkylene polyamine. In U.S. Pat. 3,346,496, a number of carbodiimides are disclosed as antioxidants for lubricants. These carbodiimides may be used alone or in combination with other compounds, such as diphenylamine. This patent does not show the reaction of the carbodiimide to produce other additives.

SUMMARY OF THE INVENTION

It has now been discovered that the reaction product produced by reacting di(organo)-phosphorodithioates with a di(organo)-carbodiimide has unexpectedly high antioxidant potency or effectiveness. Such products may be used as additive to protect an organic base medium susceptible to oxidative deterioration.

DESCRIPTION OF SPECIFIC EMBODIMENTS

The reaction involving the phosphorodithioate and a carbodiimide is believed to be one of addition wherein the adduct is made up of one mole of the carbodiimide and one mole of the phosphorodithioate.

The phosphorodithioates found useful in this invention have the formula

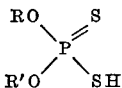

wherein R and R' are each a hydrocarbyl radical or substituted hydrocarbyl radical containing from 1 to about 30 carbon atoms, R and R' may be alkyl, cycloalkyl, alkenyl, aralkyl, aryl, alkaryl, aryloxyalkyl, alkoxyalkyl, alkoxyaryl, haloalkyl, haloaryl, and the like. When R or R' is aryl, the number of substituent groups may range from 0 up to the available number of positions, i.e. for phenyl up to 5 substituents, for naphthyl up to 7, and these groups preferably have from 1 to about 20 carbon atoms.

The phosphorodithioates may be prepared by means well known in the art. Briefly, as indicated previously, this preparation involves the reaction between an alcohol or a hydroxy aromatic compound and a phosphorus sulfide, such as $P_2S_5$, in a ratio of about 4 moles of the alcohol or hydroxy aromatic compound per mole of $P_2S_5$.

The carbodiimides used in accordance with this invention have the formula

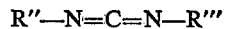

R" and R''' represent hydrocarbyl or substituted hydrocarbyl groups and may have the same identity as R and R' previously described. These groups therefore may contain from 1 to about 30 carbon atoms and are constituted of the same specific groups described previously, alkyl, aryl, and organo, oxy, and halo derivatives thereof. Carbodiimides maybe prepared in a known manner, for example, from isothiocyanates and an oxidizing agent, such as lead oxide, in the presence of an alcohol and ammonia. Catalytic conversion using phosphites is a preferred way. The oxidation of a thiourea also has been found to lead to the carbodiimide.

In the reaction procedure employed in accordance with this invention, the phosphorodithioate is mixed with the carbodiimide in a reaction vessel. The reaction temperature is 0° to 150° C. If desired, an inert organic solvent may be present to provide mobility to the reaction mixture. This solvent may be removed afterward. The reaction produces an adduct conforming substantially to a 1:1 combination of reactants. However, in accordance with this invention, as excess of either one of the reactants may be present in the reaction mixture without detracting from the additive performance characteristics of the mixture in a base medium. Hence, unreacted components may remain.

More specifically, the phosphorodithioates of this invention are those in which the hydrocarbyl group may be alkyl, such as ethyl, or propyl, butyl, hexyl, decyl, dodecyl, octadecyl including their several individual isomers and mixtures thereof, cyclohexyl; and alkoxy, aryloxy, hydroxy and halo derivatives thereof, such as chloropropyl, methoxybutyl, and the like. R or R' may also be an aromatic group, such as phenyl, naphthyl, and tolyl; or an alkylated or otherwise substituted aromatic group, such as ethylphenyl, propylphenyl, t-butylphenyl, nonylphenyl, dodecylphenyl, and polysubstituted aromatics, such as chlorodiethylphenyl, hydroxy-tripropylphenyl, etc. The halo and oxygen derivatives of R and R' may include chlorophenyl, methylchlorophenyl, t-butoxyphenyl, methyl dichlorophenyl, dibutyl chlorophenyl, and the like. R and R' are preferably aromatic.

The R" and R''' groups of the carbodiimide have the same identities as those of the R and R' groups of the phosphorodithioate ester, as mentioned previously. It should also be noted that in the phosphorodithioate ester, the R and R' groups may be different. Generally in the preparation of the carbodiimide, the organic groups are the same, but they may also be different.

The reaction to produce the adduct of this invention occurs without the formation of side products. Hence, it is presumed that the reaction product is in the nature of an adduct, although the exact structure thereof cannot be ascertained with certainty. For this reason, the product is referred to as the product of the reaction. Such a stable product is unexpected in view of the types of reaction products obtained from carbodiimides and phosphate esters containing no sulfur.

The adducts of this invention may be used as additives in a number of organic fluids or solids which are susceptible to deterioration by the action of oxidation during storage or use. Such fluids include hydraulic fluids, power transmission fluids, hydrocarbon fuels, lubricating oils, and also lubricant bases for making greases. The organic base media preferred in this invention include conventional refined lubricating oils, and synthetic oils, such as the polyolefin fluids, the ester fluids produced from polyhydric alcohols and monocarboxylic acids, polyglycol ether fluids, polyphenyl ether fluids, silicone fluids and so forth. The reaction products of this invention may be present at a concentration range of from about 0.05% to about 10% by weight and preferably from about 0.1% to about 5% by weight.

The following examples are intended to illustrate this invention more clearly without limiting its scope in any way.

EXAMPLE 1

To 76 g. (0.245 mole) of di-p-tolylphosphorodithioate dissolved in 100 ml. of benzene there is added while stirring during 0.5 hour, at 40 to 50° C. (maintained by ice bath cooling), 70 g. (0.228 mole) of bis-2,6-diethylphenyl carbodiimide. The reaction mixture is subsequently heated to 86° C. during one hour and stirred at that temperature for an additional half-hour. A white solid addition product is obtained on cooling (125 g. total) mainly melting at 135 to 137°, for which the infrared spectrum shows N—H absorption (330 cm.$^{-1}$) but no S—H or thiocarbonyl absorptions.

*Analysis.*—Calc'd for $C_{35}H_{41}O_2N_2PS_2$ (percent): P, 4.82; S, 10.4, N, 4.43. Found (percent): P, 5.02; S, 10.4; N, 4.55.

EXAMPLE 2

Following the procedure of Example 1, 51.7 g. (0.41 mole) of diisopropyl carbodiimide is added during 20 minutes to a solution of 125 g. (0.40 mole) of di-p-tolylphosphorodithioate in 125 ml. of benzene while stirring and cooling at 38 to 40° C. The reaction mixture is heated at 90° C. for about 2 hours after the addition is completed, and solvent and unreacted carbodiimide are removed by distillation under reduced pressure. There remains a clear yellow slightly viscous liquid addition product for which the infrared spectrum shows no S—H absorption and an N—H absorption at 3370 cm.$^{-1}$.

*Analysis.*—Calc'd for $C_{21}H_{29}O_2N_2PS_2$ (percent): P, 7.09; S, 14.7; N, 6.44. Found (percent): P, 7.07; S, 14.2; N, 6.08.

EXAMPLE 3

Following the procedure of Example 1, 63 g. (0.5 mole) of diisopropyl carbodiimide is added while cooling at 40 to 45° C. to a solution of 121 g. (0.5 mole) of di-n-butylphosphorodithioate in 100 ml. of benzene during 0.5 hour. The reaction mixture is then heated for 1.25 additional hours. Solvent and unreacted carbodiimide are removed by distillation under reduced pressure. After washing the residue with dilute sodium carbonate solution and drying, there is obtained 113 g. of an amber, clear, moderately viscous oil.

*Analysis.*—Calc'd for $C_{15}H_{33}O_2N_2PS_2$ (percent): P, 8.40; S, 17.5; N, 7.60. Found (percent): P, 8.34; S, 19.2; N, 5.20.

Evaluation of products

The products of this invention were tested in a solvent-refined mineral oil in varying concentrations as oxidation inhibitors. The test was carried out by passing air through a sample of the oil at 5 liters per hour for 40 hours at a temperature of 325° F. Present in the oil were samples of metals capable of acting as oxidation accelerators, namely, iron, copper, lead and aluminum. The lead sample was weighed before and after each test to determine the loss of weight, lead being presumed the most susceptible to loss in this test. The capability of an antioxidant is measured by the change in acidity of the oil sample as indicated by the increase in the neutralization number (NN change), by the formation of sludge and other oxidation products, and by the increase in the kinematic viscosity at 210° F. (percent KV increase); the corrosive loss in weight sustained by the lead sample also indicates the effectiveness of the inhibitor in controlling oxidation. The results are tabulated in the following table:

| Additive | Conc. wt., percent | NN change | Percent KV increase | Lead loss, mg. |
|---|---|---|---|---|
| None | | 17.0 | 230 | 39 |
| Product of: | | | | |
| Example 1 | 1 | 0.11 | 7 | 1.2 |
|  | 0.5 | 2.78 | 21 | 0.4 |
|  | 0.25 | 10.09 | 75 | 1.2 |
| Example 2 | 1 | 0.60 | 10 | 0.9 |
|  | 0.5 | 2.39 | 15 | 1.1 |
|  | 0.25 | 4.84 | 23 | 8.7 |
| Example 2 [1] | 1 | 2.98 | 8 | 0.4 |
|  | 0.5 | 5.34 | 21 | 0.2 |
|  | 0.25 | 6.82 | 77 | 6.4 |
| Example 3 | 1 | 10.5 | 73 | 22.8 |
|  | 0.5 | 18.25 | 200 | 72.0 |

[1] Plus 3% boronated ashless detergent.

It may be seen from the above results that the products of this invention are effective as antioxidants in a base medium which undergoes severe oxidative deterioration, particularly so when R and R' are aromatic radicals. It may also be noted that these products may be used in the base medium with other types of additives, such as detergents, extreme pressure agents, viscosity control agents and the like.

Having described my invention, without intending to place any limitation thereof, except as limited by the following claims.

I claim:

1. A compound prepared by reacting, at from 0° C. to 150° C., (1) a phosphorodithioate of the formula

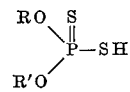

wherein R and R' are selected from the group consisting of alkyl having from 1 to about 18 carbon atoms, phenyl, naphthyl, alkyl-substituted phenyl and alkyl-substituted naphthyl, wherein the alkyl is one having from 1 to about 18 carbon atoms with (2) a carbodiimide of the formula

wherein R" and R''' have the same meaning as R and R', the reaction product conforming susbtantially to a 1:1 combination of the reactants.

2. The compound of claim 1 produced by reacting ditolyl phosphorodithioate with bis 2,6-diethylphenyl carbodiimide.

3. The compound of claim 1 produced by reacting ditolyl phosphorodithioate with diisopropyl carbodiimide.

4. The product of claim 1 produced by reacting dibutyl pohsphorodithioate with diisopropyl carbodiimide.

5. The compound of claim 1 wherein R and R' are tolyl.

6. The compound of claim 1 wherein R" and R''' are alkyl.

7. The compound of claim 1 wherein R″ and R‴ are propyl.

8. The compound of claim 1 wherein R″ and R‴ are diethylphenyl.

9. A method of producing the product of claim 1 comprising the step of reacting, at a temperature of from 0° C. to 150° C., said phosphorodithioate and said carbodiimide whereby an adduct is obtained in which the said reactants are combined in a 1:1 mole ratio.

References Cited

Khorana et al., "Chem. Abst.," vol. 48 (1954), 9901.
Mikolajczyk, "Chem. Abst.," vol. 65 (1966), 10612–3.

ANTON H. SUTTO, Primary Examiner

U.S. Cl. X.R.

260—920, 978; 252—46.6